Oct. 11, 1960  C. MATZO ET AL  2,955,374
NON-FREEZING AUTOMATIC DEVICE FOR FISHING THROUGH ICE
Filed March 12, 1959
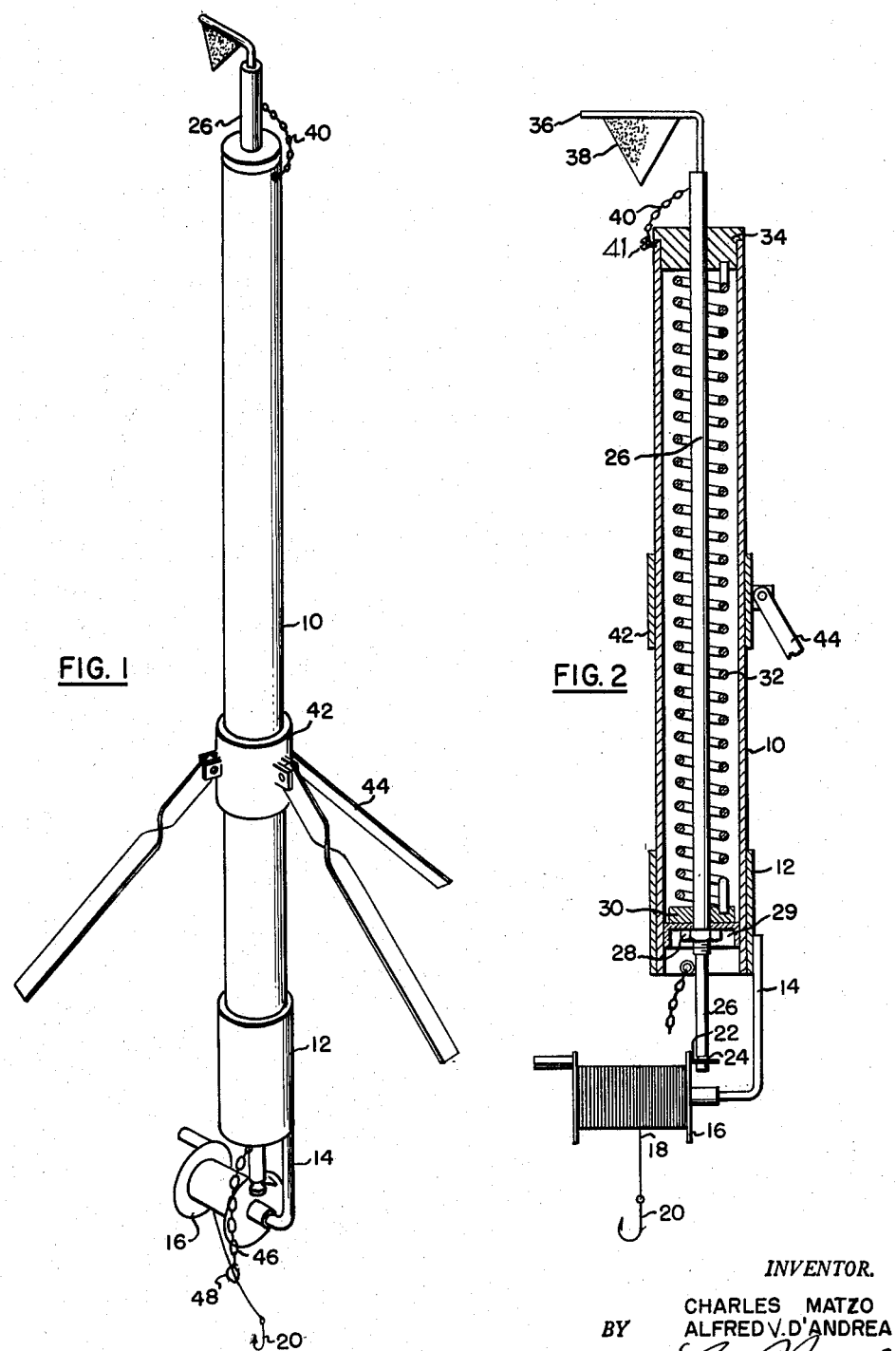
INVENTOR.
CHARLES MATZO
BY ALFRED V. D'ANDREA
Louis Necho
ATTORNEY

United States Patent Office 2,955,374
Patented Oct. 11, 1960

2,955,374

NON-FREEZING AUTOMATIC DEVICE FOR FISHING THROUGH ICE

Charles Matzo, 443 Woodland Ave., and Alfred V. D'Andrea, Tafton Diner, Rte. 6, both of Hawley, Pa.

Filed Mar. 12, 1959, Ser. No. 798,950

1 Claim. (Cl. 43—16)

In fishing through ice, the practice is to drop the fishing line through a hole in the ice, and to enable the fisherman to take shelter between bites, it has been proposed to use a device which, when the bait is taken, gives a signal visible from the shelter.

One object of this invention is to produce an improved device of the type set forth.

A further object is to produce a device of the type set forth which, in addition to signalling a bit, also operates automatically to hook the fish. The full nature of the invention will be understood from the following specification and the accompanying drawings in which:

Fig. 1 is a perspective view of a fishing device embodying the invention.

Fig. 2 is a view partly in elevation and partly in vertical section of the same.

The device embodying the invention includes an elongated tubular member 10 to the lower end of which is secured a sleeve 12 which carries an arm 14 on which is mounted a reel 16. Reel 16 carries a fishing line 18 at the end of which is a fish hook 20. One end plate of reel 16 is provided with a lug 22 which is engageable with a notch 24 formed at the lower end of a plunger 26 to keep the plunger in the position of Fig. 1. Plunger 26 is also provided with a threaded nut 28 and a fixed washer 30, which co-act to clamp an inverted cup washer 29. Plunger 26 is surrounded by a spring 32 the lower end of which engages washer 30 and the upper end of which engages plug 34 which closes the upper end of tubular member 10 and through which plunger 26 projects. The upper end of plunger 26 carries a chain 40 which is detachably engageable with a screw, or other projection, 41, to hold the plunger in the position as shown in Fig. 1, when lug 22 is out of engagement with notch 24. Intermediate its ends, tubular member 10 also carries sleeve 42 to which are pivotally secured three or four arms 44.

The operation is as follows:

When it is desired to use the fishing device, the baited hook is lowered to the desired extent through a hole in the ice; lug 22 is engaged with notch 24; chain 40 is disengaged from screw 41 and arms 44 are disposed substantially horizontally to support the fishing device in position. When a fish tugs at the bait, it rotates reel 16 and disengages lug 22 from plunger 24 whereupon spring 32 will move plunger 26 upwardly through tubular member 10. The upward movement of flag 38 informs the fisherman that the bait has been taken.

The device can be made automatic by the provision of a chain 46 at the lower end of which is a ring 48 through which the fishing line can be passed, as shown in Fig. 1 so that, when a fish takes the bait, the sudden upward movement of plunger 26 and the resultant pull on the fishing line, will set the hook in the jaw on the fish in the same manner as when a fisherman jerks the line when he suspects that a fish is swallowing the bait.

By the use of chain 40 and lug 41, plunger 26 will be retained within tubular member 10 when the device is not in use to facilitate carrying and storing the device.

During the assembly of the device, a light, cold temperature resisting oil is placed in tubular member 10. Also, plunger 26 fits snugly in plug 34 and cup washer 29 fits snugly in tubular member 10. By this arrangement, movement of plunger 26 keeps the wall of the opening in plug 34 covered with a film of oil so that no moisture can enter the tubular member from the top. Similarly, the movement of washer 29 keeps the lower portion of the tubular member lubricated so that no water will adhere to, and freeze on, the interior of the tubular member.

What we claim is:

A device for fishing through ice, said device including an elongated tubular member insertable through a hole in the ice, pivoted arms carried by said tubular member and movable to a position at an angle to the axis of said tubular member to support said device on the rim of said hole, a fixed plug closing the upper end of said tubular member and having a through opening therein, a plunger disposed in said tubular member with its upper end movable through said opening, an inverted cup washer fixedly carried by the lower end of said plunger and fitting snugly within said tubular member, a spring confined between said washer and said plug and normally operative to push said plunger upwardly and outwardly of said tubular member, a screw on the outside of the upper end of said tubular member, a short fastening element carried by the upper end of said plunger and detachably engageable with said screw for retaining said plunger in said tubular member against the action of said spring, a reel carrying a fishing line, means mounting said reel on the lower end of said tubular member adjacent the lower end of said plunger which projects through the lower end of said tubular member, there being a notch in said lower end of said plunger, and a lug carried by said reel and engageable with said notch to keep said plunger in said innermost position when said fastening element is disengaged from said screw, and a flexible element carried by the lower end of said plunger and engageable with said fishing line whereby upward movement of said plunger, upon disengagement of said lug from said notch, will exert an upward pull on said fishing line.

References Cited in the file of this patent

UNITED STATES PATENTS

| | | |
|---|---|---|
| 2,491,731 | Hall | Dec. 20, 1949 |
| 2,693,046 | Langevin | Nov. 2, 1954 |
| 2,712,194 | DiStefano | July 5, 1955 |

FOREIGN PATENTS

| | | |
|---|---|---|
| 872,745 | France | 1942 |